INVENTOR
John Mayo
By Green & McCallister
His Attorneys

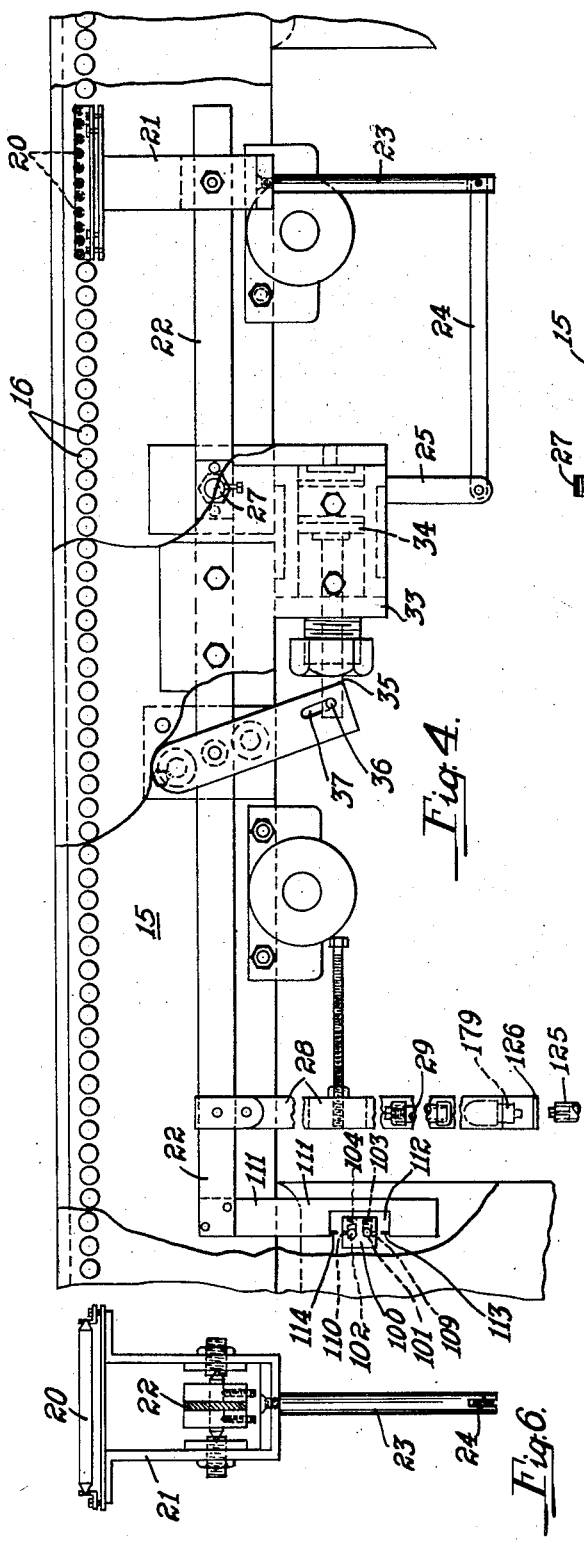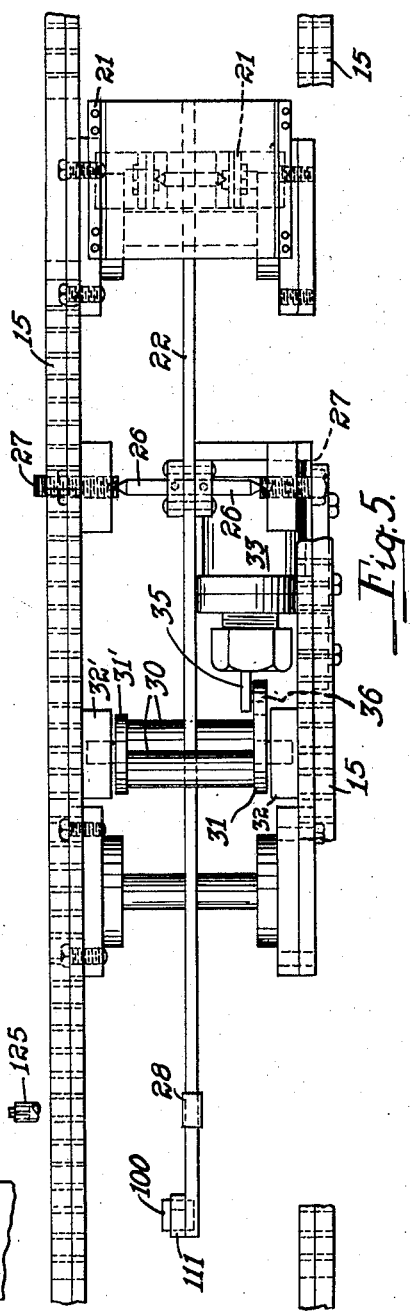

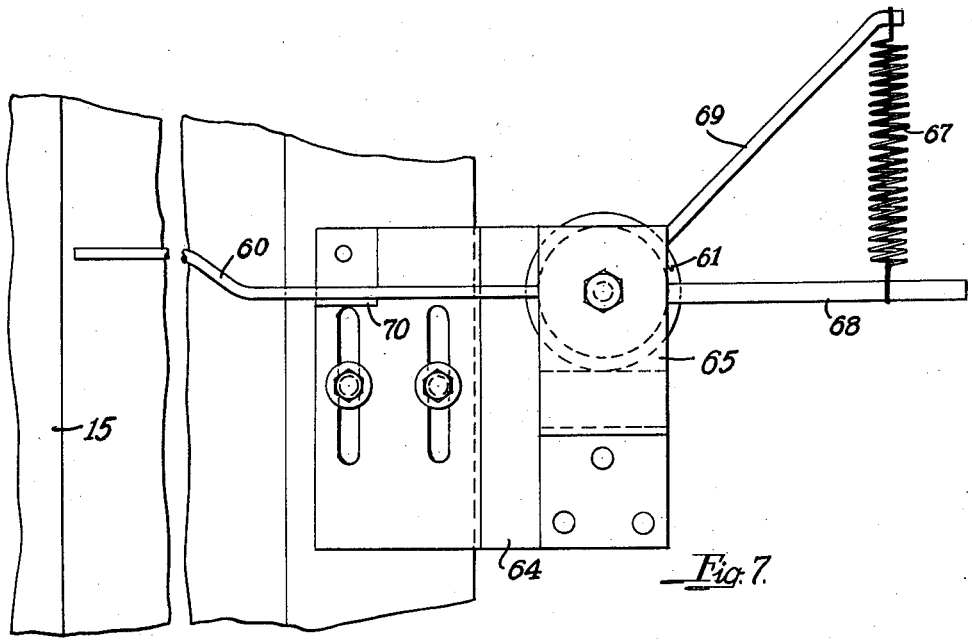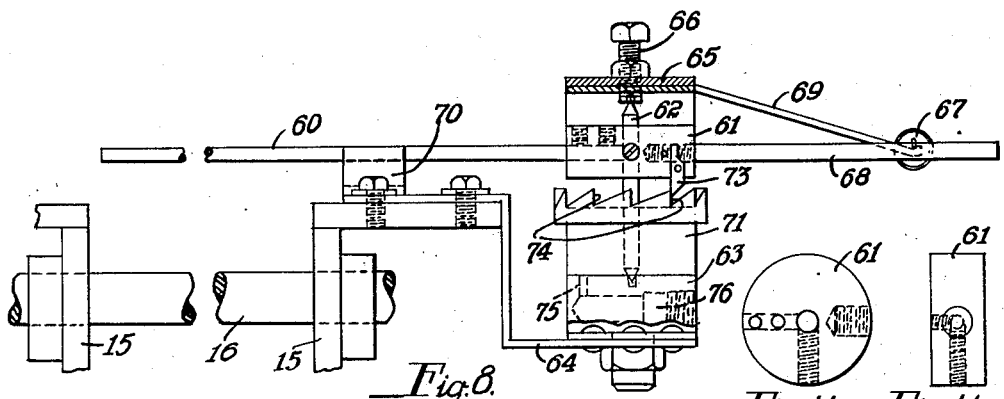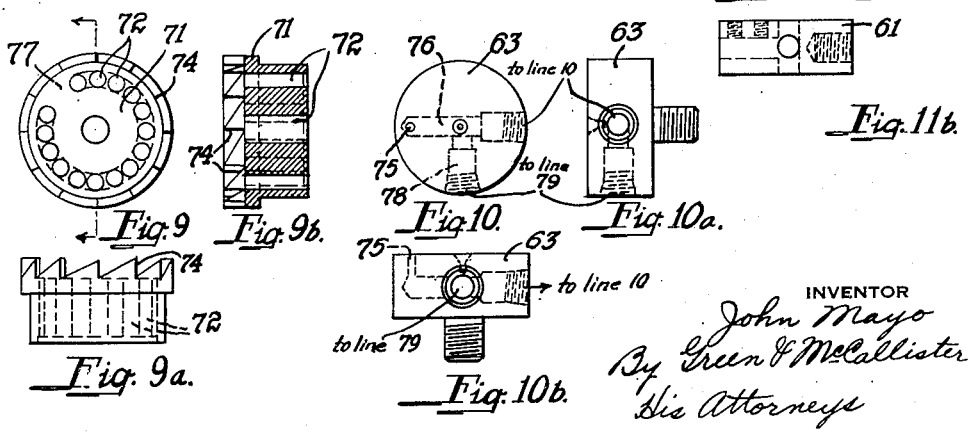

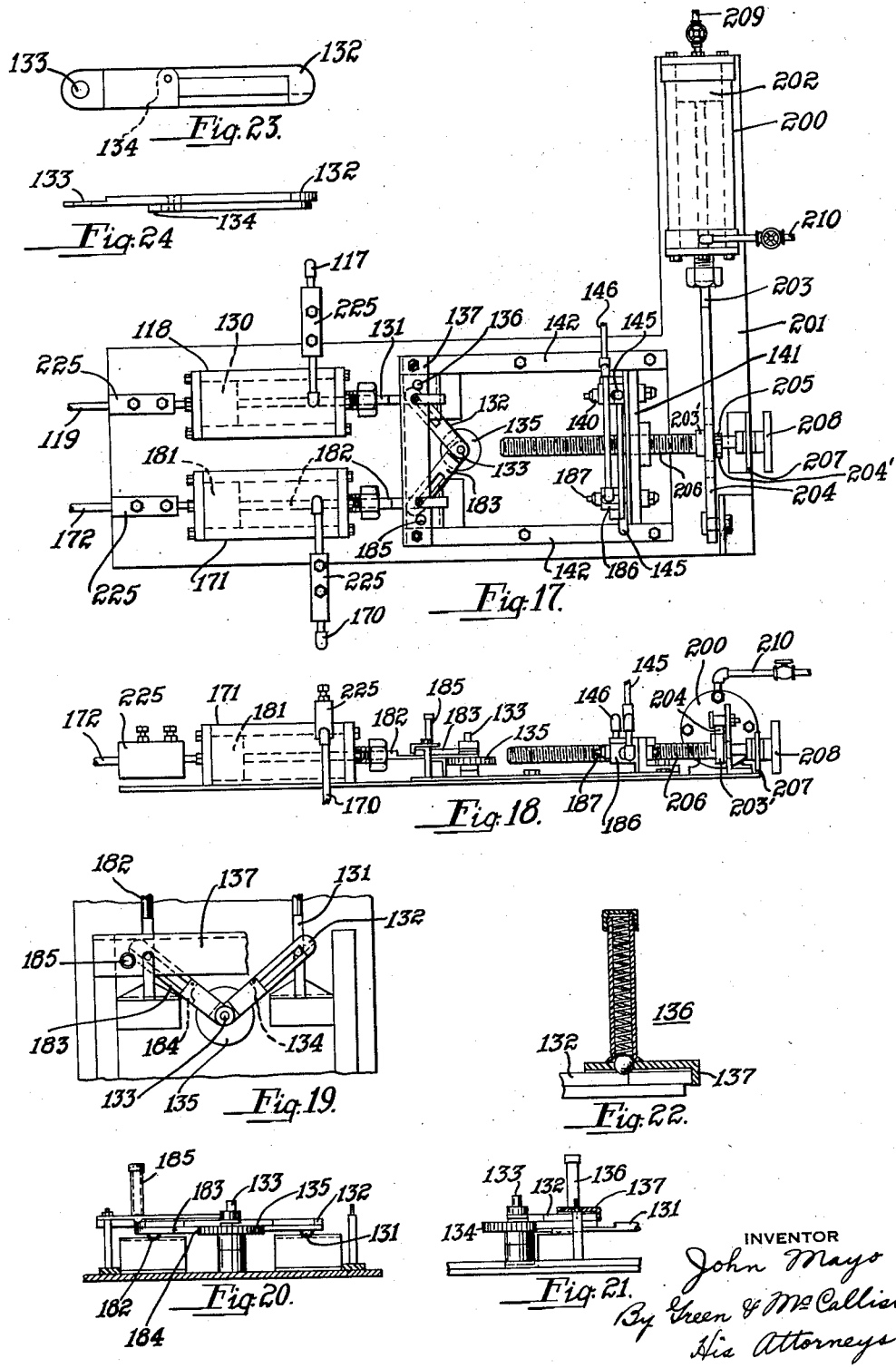

Aug. 11, 1936.  J. MAYO  2,050,496
APPARATUS FOR AUTOMATICALLY REGULATING THE FEED
CONTROL ON FEEDING AND FILLING DEVICES
Filed Feb. 2, 1933   10 Sheets-Sheet 8
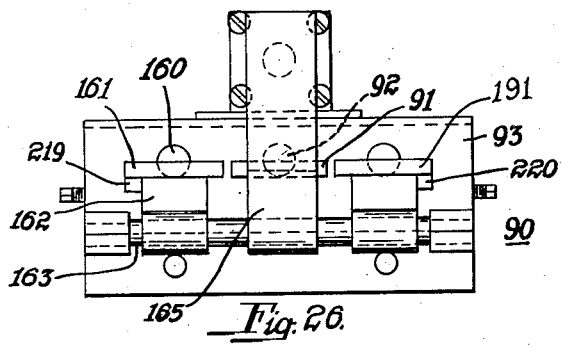
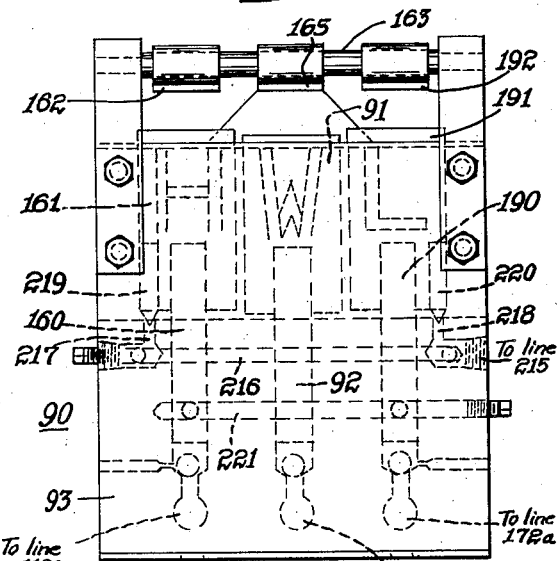
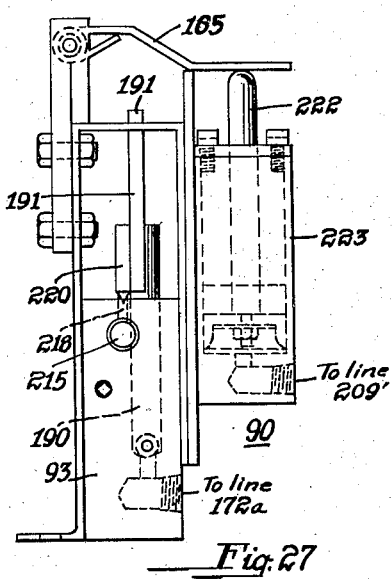
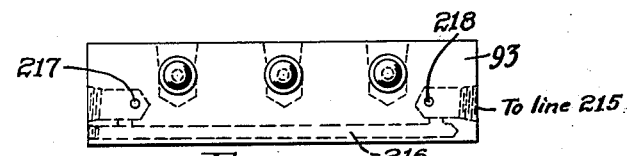
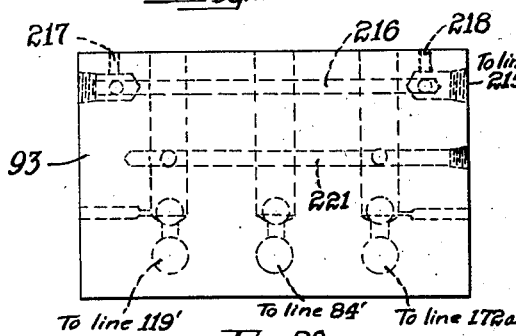
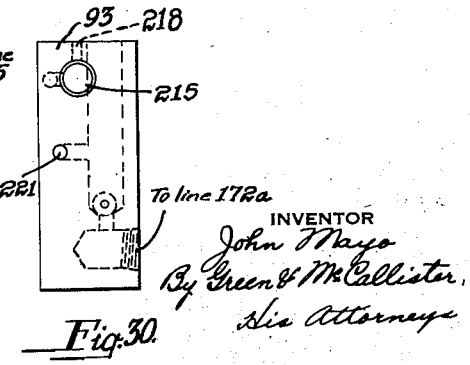

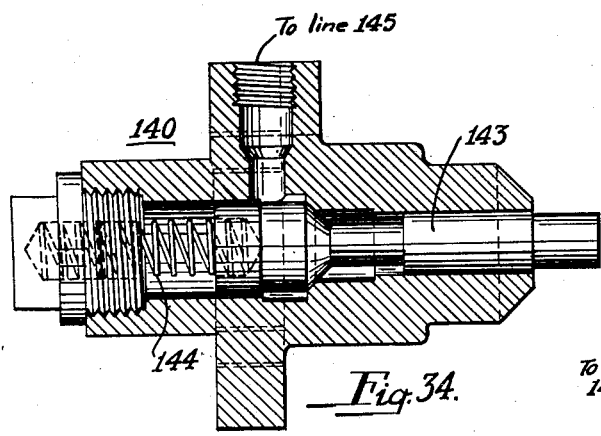
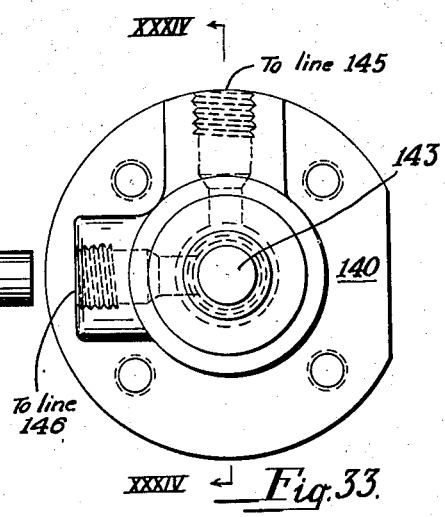
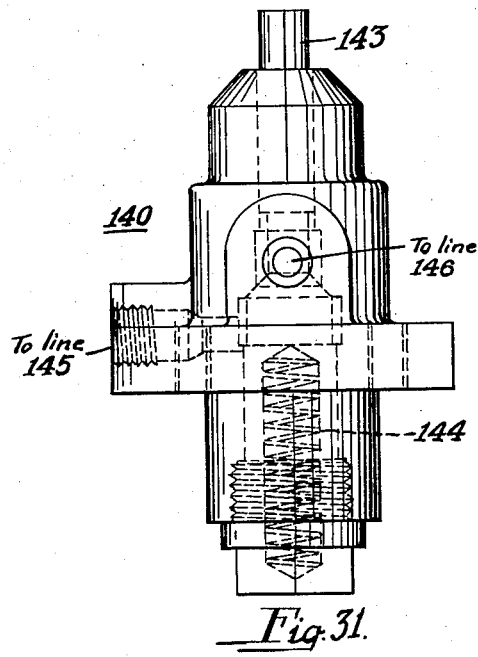
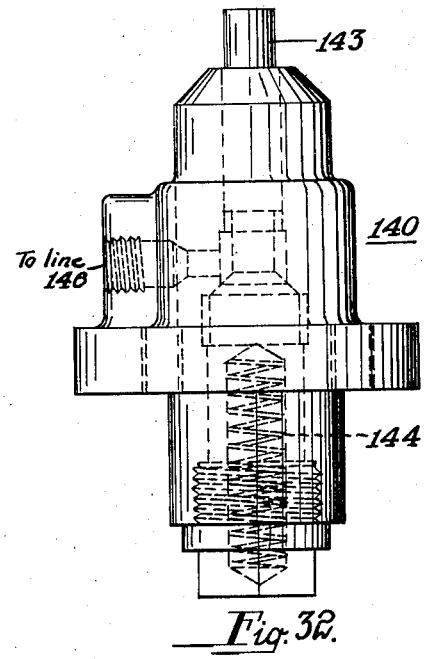

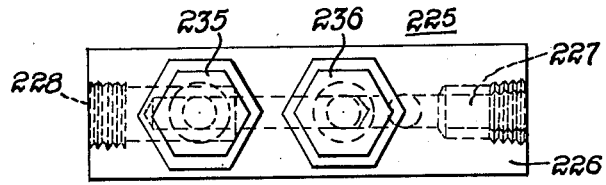
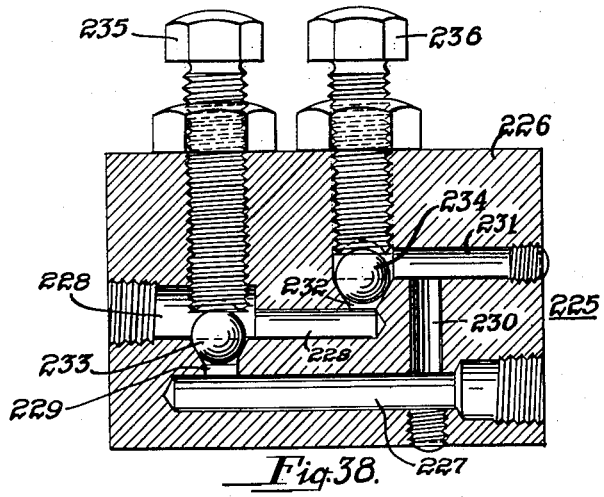
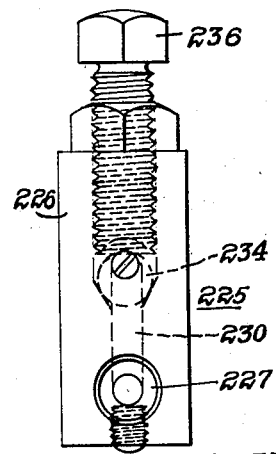
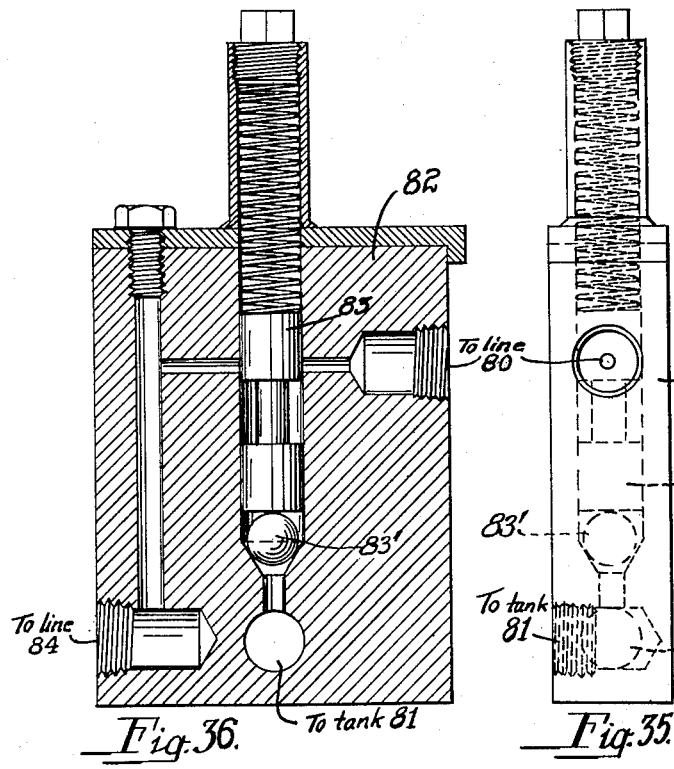
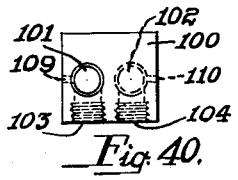
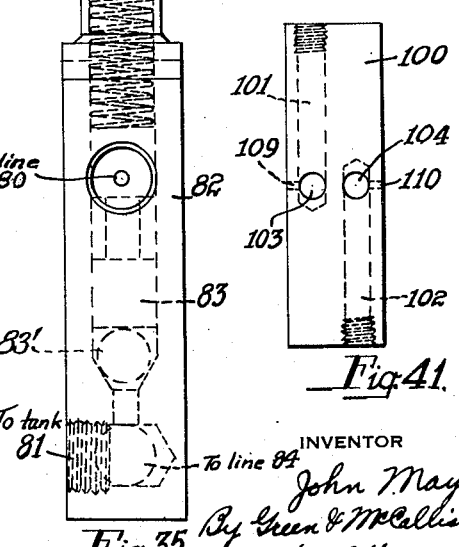

Patented Aug. 11, 1936

2,050,496

UNITED STATES PATENT OFFICE 2,050,496

APPARATUS FOR AUTOMATICALLY REGULATING THE FEED CONTROL ON FEEDING AND FILLING DEVICES

John Mayo, Carnegie, Pa.

Application February 2, 1933, Serial No. 654,869

37 Claims. (Cl. 249—1)

This invention relates to filling and feeding devices used in the manufacture, packing and fabrication of commodities such as cement, flour, prepared baking mixtures, glass vessels, syrups and the like, and more particularly to mechanism for automatically adjusting the feed control on such filling and feeding devices to regulate the weight or amount of material being periodically fed from the device.

One object of this invention is to provide means for automatically controlling the feed from such device in accordance with fluctuations from a predetermined weight of the material previously fed from the device.

Another object is to provide apparatus for automatically maintaining the quantity of material being periodically discharged by a filling or feeding device, of a uniform and predetermined weight.

A further object is to provide apparatus having means for weighing a quantity of material fed from a filling or feeding device and means associated therewith for automatically adjusting the feed control of said device if the quantity of the material weighed is either above or below a predetermined amount.

A still further object is to provide apparatus for automatically adjusting the feed control on a feeding or filling device to secure a succession of uniform charges in which the charges are weighed and the adjustment made in the feed control in accordance with the fluctuations from a predetermined weight of the charges weighed.

A still further object is to provide apparatus for adjusting the feed control on a feeding or filling device to secure a succession of charges of uniform weight which weighs the charges, detects and amplifies slight fluctuations from the predetermined weight, adjusts the control in accordance with these fluctuations, prevents false adjustment of the feed control, and reduces the adjustment of the control when the charges fluctuate from one side to the other of the predetermined weight.

A still further object is to provide mechanism for adjusting the feed control of a feeding or filling device in accordance with variations from a predetermined weight in the charges previously fed from the device and having means associated therewith for preventing fluctuations of weight in the material delivered from said device.

A still further object is to provide apparatus which automatically weighs a quantity of material delivered from a filling or feeding device, adjusts the feed control on the device when the quantity weighed is above or below a predetermined weight, and reduces the amount of adjustment imparted to the feed control when the first quantity weighed is above or below the predetermined weight and the next is below or above the predetermined weight to prevent repeating fluctuations of weight in the material being fed.

A still further object is to provide means for cross locking the weighing mechanism to prevent false impulses to the feed control regulating mechanism.

These and other objects which hereinafter will be made apparent to those skilled in this particular art are accomplished by means of this invention, one embodiment of which is described in the following specification and illustrated in the accompanying drawings, wherein:

Fig. 4 is an enlarged view in elevation of the weighing mechanism of my apparatus, portions of the conveyor being broken away to show the mounting of the mechanism;

Fig. 5 is a partial plan view of the frame of the conveyor showing the weighing mechanism;

Fig. 6 is a detail view showing the construction of the weighing platform;

Fig. 7 is an enlarged plan view of the counting mechanism for unlocking the weighing mechanism;

Fig. 8 is a view in elevation of the mechanism illustrated in Fig. 7;

Figure 12:
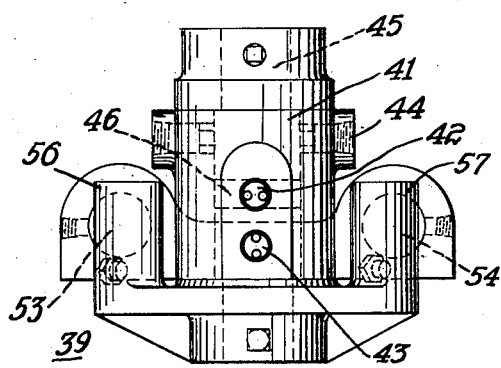
Figure 15:
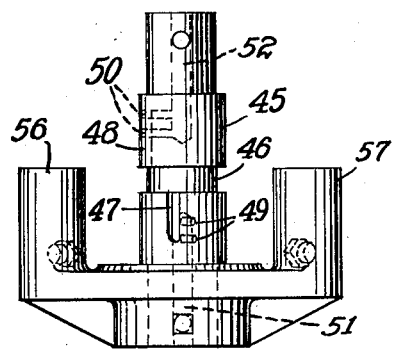
Figure 13:
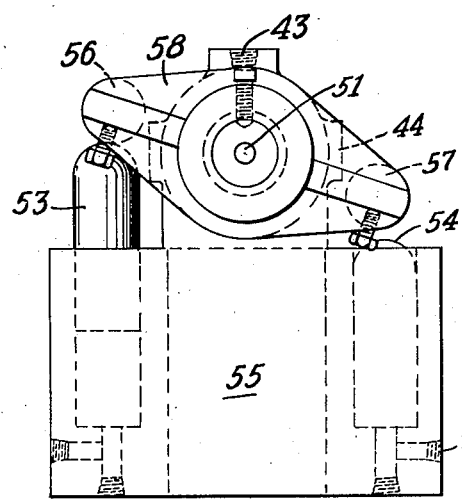
Figure 14:
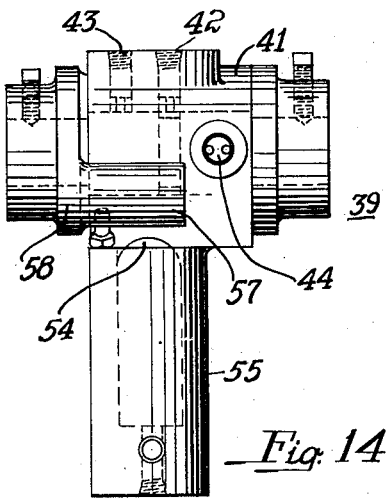
Figure 16:
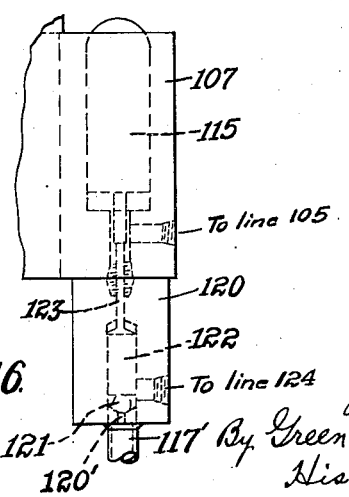

Figs. 9, 9a, and 9b are plan, side elevation, and sectional views, respectively, of the block valve of the counting mechanism;

Figs. 10, 10a, and 10b are a plan, a side, and an end elevation of a block on which the block valve is mounted;

Figs. 11, 11a, and 11b are a plan, a side, and end elevation views, respectively, of the block carrying the counter which turns the block valve;

Fig. 12 is an enlarged plan view of a reversing valve employed in my apparatus;

Fig. 13 is a side elevation of the reversing valve;

Fig. 14 is an end elevation of the reversing valve;

Fig. 15 is a plan view of the rocker arm of the reversing valve;

Fig. 16 is a partial view in end elevation of a valve used to amplify the motive impulse delivered to the operating piston of a reversing valve;

Fig. 17 is a plan view of the mechanism employed to operate the feed control on the feeding or filling device;

Fig. 18 is a side elevation of the feed control operating mechanism;

Fig. 19 is an enlarged plan view of the mechanism for turning the feed control adjusting means illustrating the connection between the operating mechanism and the feed control adjustment;

Fig. 20 is an end elevation of the mechanism illustrated in Fig. 19;

Fig. 21 is a side elevation of the mechanism shown in Fig. 19;

Fig. 22 is an enlarged sectional view of the means for causing the latch to engage the adjusting screw of the feed control;

Figs. 23 and 24 are a plan and side view, respectively, of the latching fingers;

Fig. 25 is a front elevation of an indicating mechanism employed in my apparatus;

Fig. 26 is a plan view of the indicating mechanism;

Fig. 27 is an end elevation of the indicating mechanism;

Figs. 28, 29, and 30 are a plan, a side, and an end elevation illustrating the construction of the block valve of the indicating mechanism;

Fig. 31 is an enlarged side elevation of a poppet valve used to reset the mechanism of the apparatus after an adjustment has been made in the feed control;

Fig. 32 is an elevation of the resetting valve taken at 90° to the view illustrated in Fig. 31;

Fig. 33 is a plan view of the resetting valve;

Fig. 34 is a section taken on line XXXIV—XXXIV of Figure 33;

Fig. 35 is an end view of a poppet valve used to reset the locking means of the weighing mechanism;

Fig. 36 is a sectional view of the poppet valve shown in Fig. 35;

Fig. 37 is an end view of a check valve used to control the speed of my apparatus;

Fig. 38 is a sectional view of the check valve;

Fig. 39 is a plan view of the check valve;

Fig. 40 is an end view of the block valve used in conjunction with the weighing mechanism to create the impulses for actuating the mechanism operating the feed control adjustment; and Fig. 41 is a side view of the block valve shown in Fig. 40.

In general, my invention comprises an apparatus adapted to automatically adjust the feed control on a feeding or filling device to secure uniform feed charges of a predetermined weight, and is operated by the variations from correct weight of the charges being fed from such a device.

The apparatus comprises a weighing mechanism having a scale platform on which the material being periodically discharged or fed from the feeding or filling device is momentarily placed. The weighing mechanism is normally locked in an inoperative position and so that only a certain preselected number of the charges fed by the device will be weighed. The weighing mechanism is normally locked in inoperative position and means are provided which automatically locks and unlocks the scale in accordance with the number of charges coming to rest on the scale platform. When a selected charge is in position on the scale platform an impulse is created which actuates the scale locking means to unlock the weighing mechanism so that fluctuations in the material from a predetermined or correct weight will be noted. The unlocking of the weighing mechanism also actuates an indicating device which shows that the apparatus is working properly and that the charge on the scale platform is being weighed. After the weighing mechanism has been unlocked for a predetermined time, the locking means is actuated and the weighing mechanism is again locked in its inoperative position.

If, during the time that the weighing mechanism is unlocked, the material momentarily resting thereon is above or below the predetermined weight, the end of the scale beam of the weighing mechanism is caused to move up or down depending on whether material is light or heavy. In order to adjust the feed control of the feeding device, in accordance with these deflections of the scale beam, means are provided which, if the material on the scale platform is above correct weight, operates a motor which turns the adjustment on the feed control of the feeding device in such a way that the weight of the succeeding charges will be reduced. At the same time that the motor is operated, a marker in the indicating device designating that the charge being weighed is heavy, is raised, which marker remains in its raised position until a succeeding charge is weighed.

As soon as the adjustment has been made in the feed control, the motor operating the adjustment on the feed control is reversed and placed in readiness to again operate the adjustment, if the next quantity weighed is still above the predetermined or correct weight.

If the material on the weighing platform is below the predetermined weight instead of above, other means are actuated by the downward movement of the scale beam which operates another motor and turns the adjustment on the feed control in such a way that the weight of succeeding charges delivered from the feeding device will be increased. At the same time that this motor is operated, a marker of the indicating device, designating light weight, is raised and held in its raised position until the feed control adjustment has been regulated sufficiently to increase the weight of the charge to the exact or correct weight. As soon as the adjustment of the feed control has been made in accordance with the light weight of the charge on the platform, the motor is reversed and placed in position to again operate the adjustment on the feed control if the next succeeding charge weighed is still below correct weight.

If, however, the regulation of the adjustment on the feed control causes the succeeding charge fed from the feeding or filling device to fluctuate from heavy to light or from light to heavy before correct weight is reached and while the heavy or light marker is still in its raised position, another motor is actuated on the raising of both the light and heavy markers which reduces the amount of regulation that can be imparted to the adjustment on the feed control by the motors actuated by the fluctuation of the scale beam. This reducing of the amount of regulation of the adjustment on the feed control prevents the adjustment from being turned back and forth past the point where correct weight would be obtained and as a result, the delivery of succeeding charges of a uniform weight is assured.

While it is to be understood that my apparatus may be used with any feeding or filling device having an adjustment for controlling the feed to secure a discharge of uniform weight, I will, for convenience, describe my apparatus in detail as if it were being used to regulate the adjustment on a glass feeder or feeding device which is adapted to periodically feed a succession of gobs or drops of glass of a uniform weight.

In the drawings, I have illustrated in detail my improved apparatus for adjusting the feed control on glass and/or other feeding or filling devices. In the apparatus as illustrated all the various parts thereof are operated by compressed air delivered thereto through a main supply line 10 leading from a storage tank 11 in which the air is maintained under constant pressure, preferably about 15#, by a reducing valve 12 interposed in a line 13 leading from a suitable source of air supply to the tank 11. So that the weight of the gob being delivered by the feeder may be readily determined without unnecessary handling, I have shown my apparatus as applied to a conveyor for conveying ware from a forming machine (not shown) into which the gobs or drops of glass are periodically fed from a feeder to a leer or the like. The conveyor comprises a frame 15 supporting a series of closely spaced rollers 16 constantly driven through suitable mechanism by a motor 17. The ware, as it leaves the forming machine is placed on a revolving disc 18 supported on the frame 15 from which it is deflected on to the conveyor rollers 16.

To determine whether the gobs of glass being periodically fed by the feeder to the forming machine are of a correct or predetermined weight, I provide means for weighing the ware as it is conveyed from the forming machine. To weigh the ware, a group of rollers 16 are replaced by a series of idle rollers 20 forming the platform for the weighing mechanism (Figs. 4, 5, and 6).

These rollers 20 are rotatably mounted in a U-shaped frame 21 which is pivoted in jewel bearings to one end of a scale beam 22. So that correct weight will be indicated regardless of the position of the ware on the rollers 20, the supporting frame 21 has a rod 23 depending from the base thereof which is pivotally connected to one end of a link 24, the opposite end of which is pivoted to a stationary rod 25 secured to the frame of the conveyor.

From this arrangement, it is apparent that the scale platform is permitted to move freely up and down with variations of weight in the ware placed thereon but it is prevented from tilting if the ware being weighed is not centered on the rollers 20 and consequently, the correct weight of the ware on the rollers will be indicated regardless of its position on the scale platform.

The scale beam 22 of the weighing mechanism is mounted on a pin 26, the ends of which are pointed to form jewelled bearing surfaces with supporting members 27 mounted in the frame 15 of the conveyor.

To balance the scale beam 22, a lever 28 is pivoted to the back end thereof which is of such length that it balances the scale platform and maintains the scale beam in a horizontal position. With a balance of such construction, a plug 29 of suitable weight, preferably the exact weight of the gob desired to be fed from the feeder is hung on the lever 28 against which the weight of the ware on the platform is balanced. The plug 29 may be readily removed and replaced by a plug of suitable weight to balance any weight of gob.

When the feeder is in operation, gobs of glass are fed into the forming machine in which they are molded into ware. After the gob has been molded into the desired shape, it is placed on the disc 18 by the forming machine take-out mechanism (not shown) from which it is deflected onto the constantly driven rollers 16. These rollers 16 convey each piece of ware onto the idle rollers 20 where it remains until it is pushed thereacross by the next succeeding piece of ware.

Since a gob is delivered to each of the molds in the forming machine before a piece of ware formed from one of those gobs is placed on the disc 18, it is apparent that only one piece of ware should be weighed from each filling of the forming machine and after one piece of ware has been weighed and adjustment in the feed control has been made, no further adjustment should be made therein until a piece of ware formed from a gob fed to the mold after the adjustment has been made is delivered to the scale platform. Since only one out of a certain number of pieces of ware passing across the scale platform should be weighed, means are provided for locking the scale beam 22 in its inoperative position.

The scale beam locking means comprises a pair of rollers 30, carried in supporting members 31 and 31' which are pivotally mounted in blocks 32 and 32' secured to the frame 15. The rollers 30 are so mounted in the members 31 and 31' that one is above and the other below the scale beam and are so spaced apart that when the members 31 and 31' are turned to a vertical position the scale beam is free to move up and down between the rollers, but when the members are turned away from their vertical position the rollers 30 engage the beam on opposite sides and lock it against movement.

To turn the members 31 and 31' and move the rollers 30 to their locking and unlocking positions, an air motor is provided which is connected to the member 31. The air motor comprises a cylinder 33 secured to the frame 15 and has a piston 34 slidably mounted therein to which a piston rod 35 is secured. The piston rod 35 carries a pin 36 which is received in a slot 37 formed in the end of the member 31 so that movement of the piston 34 back and forth in the cylinder will lock and unlock, respectively, the scale beam 22. Normally the piston 34 is held in its rearward position to lock the scale beam 22 in its inoperative position by air admitted to the front end of the cylinder through a line 38 connected to a valve 39 which, in turn, is connected to the main air line 10. The valve 39 (Figs. 12, 13, 14, and 15) which is of the reversing type and controls the delivery of air to the front end of the cylinder 33 through the pipe 38 and to the rear end of the cylinder through a pipe 40 comprises a housing 41 having an opening 42 therein to which the line 10 is connected, an opening 43 to which the line 38 is connected, and an opening 44 to which the line 40 is connected and a rocker shaft 45.

The rocker shaft 45 has a peripheral recess 46 therein which communicates with the opening 42 in the valve housing and is constantly supplied with air from the pipe 10. The shaft 45 is also provided with slots 47 and 48 leading from opposite sides of the recess 46 and openings 49 and 50 which communicate with longitudinally extending exhaust openings 51 and 52, respectively, drilled in the shaft. The slots 47 and 48 and the openings 49 and 50 are so spaced around the periphery of the shaft 45 that when the slot 47 is in communication with the opening 43 and air is being delivered to the front end of the cylinder 33, through the pipe 38, the openings 50 are registering with the air line 40 to permit the air in the back end of the cylinder to exhaust through the opening 52 and when the slot 48 is in communication with the pipe 40, the openings 49 are registering with the pipe 38 to permit the air in front end of the cylinder to be exhausted through the opening 51.

The rocker shaft 45 is oscillated in the housing to reverse the delivery of air to the cylinder 33, by trip pistons 53 and 54 slidably mounted in a block 55 and adapted to strike shoulders 56 and 57, respectively, on an arm 58 secured to the shaft 45.

In order to unlock the scale beam 22 to weigh a preselected piece of ware, I provide mechanism for counting the pieces of ware passing over the scale platform which, when a certain number if pieces have been conveyed thereacross, actuates the reversing valve 39 which causes air to be delivered to the rear end of the cylinder 33 and connects the front end of the cylinder to the exhaust.

The counting mechanism comprises an arm 60 (Figs. 7 to 11b, incl.) which is secured to a block 61 mounted on an upright rotatable pin 62 journaled at the bottom in a block 63 secured to a support 64. The support 64 is bolted to the frame 15 and has a member 65 extending upwardly therefrom and carries a plug 66 in which the upper end of the pin 62 is journaled. The arm 60 projects over the conveyor rollers 16 into the path of the oncoming pieces of ware so that, as the piece of ware leaves the scale rollers 20, it strikes the arm 60 and turns it sufficiently to let the ware pass. As soon as the ware is conveyed past the end of the arm 60 it is returned to its original position parallel with the conveyor rollers 16 by a spring 67 attached to a rod 68 extending outwardly from the block 61 and to an arm 69 on the support 64. A stop 70 on the support 64 limits the return movement of the arm 60 and places it in position to be deflected by the next piece of ware being conveyed on the rollers 16.

Each time the arm 60 is deflected and the block 61 turned by a piece of ware, a block valve 71 rotatably mounted on the block 63 and having a series of openings 72 extending therethrough is also turned through trigger 73 pivoted to the block 61 and teeth 74 in the block 71 forming a ratchet between the two blocks.

Each time the block valve 71 is turned one of the openings 72 is moved into registration with the vent 75 in the block 63 and through which air from the main air line 10 is continually exhausting. The vent 75 is connected to the air line 10 by a passageway 76. When a certain number of pieces of ware have deflected the arm 60 and the next piece is to be weighed, the block valve 71 has been so turned that a solid space indicated at 77 is moved entirely over and momentarily closes the vent 75. The closing of the vent 75 causes the air from the main line 10 to pass through a passageway 78 in the block 63 and in a line 79 leading to the underside of the trip piston 54 of reversing valve 39.

The closing of the vent 75 builds up a momentary pressure impulse in line 79 which raises the piston 54 and turns the rocker shaft 45 of the valve 39, after which piston 54 drops down to reset position. The operation of reversing valve 39 as heretofore pointed out, causes air to be delivered to the rear end of the cylinder 33 which moves the piston 34 and piston rod 35 forwardly and turns the members 31 and 31' to their vertical position to unlock the scale beam 22 and permit the ware on the scale platform 20 to be weighed. The operation of the apparatus when the ware being weighed is either light or heavy will be hereinafter described.

So that the scale beam 22 will be unlocked for a predetermined length of time only, means are provided which reset the valve 39 so that air will again be delivered to the front end of the cylinder 33. To reset the valve 39 and lock the scale beam 22, a portion of the air passing into the line 40 from the valve 39 is diverted through a line 80 having two branches one of which leads to one end of a tank 81 while the other is connected to a poppet valve 82 (Figs. 35–36) which in turn is connected to the tank on the opposite end thereof. The valve 82 is normally closed by a ball 83' which supports a spring pressed valve stem 83. When the pressure in the tank 81 has been built up sufficiently to overcome the action of the spring, the ball 83' is unseated and the stem 83 is raised to connect the line 80 to a line 84 leading to the underside of the trip piston 53 of the valve 39. When the line 80 is connected across the valve 82 to the line 84, the trip piston 53 is raised and turns the rocker shaft 45 to its original position so that the air in line 10 is again passing through line 38 to the front end of the cylinder 33 while the back end of the cylinder is connected to the exhaust 52. The piston 34 is then moved toward the rear of the cylinder and through its associated mechanism turns the members 31 and 31' to bring the rollers 30 into locking engagement with the scale beam 22.

To control and adjusting the length of the weighing time, a needle valve 85 is interposed in the branch of the line 80 leading to the tank 81 to regulate the flow of air into the tank and consequently, the speed of building up sufficient pressure therein to unseat the ball 83' and raise the valve stem 83.

In order that the operator or attendant may see that the apparatus is functioning properly, an indicating device designated in its entirety as 90, is provided having a marker 91 carrying suitable indicia such as the letter "W" which is adapted to be raised into view each time the scale beam is unlocked. When the marker 91 is raised it shows the operator or attendant that the ware on the scale platform is being weighed and if none of the other markers of the apparatus which will be later described, are operated, it also indicates that the ware is of the correct or predetermined weight. To raise the marker 91 each time the scale beam 22 is unlocked, the line 84 is provided with a branch 84' which leads to the underside of a piston 92 (Figs. 25 to 30), carrying the marker 91. The piston 92 is mounted in a housing 93 and each time the line 84 is connected to the line 80, the piston is raised and moves the marker 91 into view. As soon as the valve 39 has been reset, the air in lines 84 and 84' is shut off and the marker 91 drops back into the housing 93 out of sight of the operator.

When the scale beam is unlocked and the ware on the scale platform 20 is above or below the correct weight, the end of the scale beam 22 is caused to move up or down depending on whether the ware is heavy or light, respectively. To regulate the feed control adjustment in accordance with the weight of the ware on the scale platform, means are provided for turning these movements of the scale beam into impulses for actuating mechanisms which, in turn, operate the adjustment on the feed control.

The means for creating these impulses in accordance with the deflection of the scale beam 22 comprises a block valve 100 (Figs. 40 and 41) having passageways 101 and 102 therein which are connected to branches of the main air line 10. The air entering the passageways 101 and 102 from the main air line passes into passageways 103 and 104 leading to lines 105 and 106 connecting the valve 100 with reversing valves 107 and 108, respectively, the purpose of which will be more fully set forth hereinafter.

The reversing valves 107 and 108 are similar in construction to the valve 39 and to prevent them from being operated when the scale is in equilibrium, a sufficient amount of air passing into the passageways 101 and 102 is permitted to exhaust through vents 109 and 110 formed in opposite faces of the block 100 to reduce the pressure in the lines 105 and 106 to such an extent that it is insufficient to raise the operating pistons of the valves 107 and 108.

To close the vents 109 and 110 and build up the pressure in lines 105 and 106, an arm 111 having a recess 112 therein is so secured to the end of the scale beam 22 that the block 100 extends into the recess 112. The arm 111 carries pins 113 and 114 which, when the scale beam moves up and down, are disposed to fit in and close the vents 109 and 110, respectively.

From this construction it is apparent that if the ware on the scale platform is above the predetermined or correct weight and the end of the scale beam 22 is raised, the pin 113 will be moved into and close the vent 109 in the block valve 100. When the vent 109 is closed, all the air passing into the block 100 through the passageway 101 is directed through the passageway 103 communicating therewith into the line 105 leading to the underside of a trip piston 115 operating the valve 107. As the pressure builds up in the line 105, the trip piston 115 is raised and turns a rocker arm 116 which reverses the valve 107.

The valve 107 is connected to the main air line 10 and before the rocker arm 116 is turned, is delivering air through a line 117 to the front end of an air motor or cylinder 118 which controls the operation of the adjustment on the feed control of the feeder. The rear end of the cylinder 118 is connected, through a line 119 to the exhaust of the valve 107.

When the rocker arm 116 of the valve is turned, the main air line 10 is connected across the valve to the line 119 leading to the rear end of the cylinder 118 and the air in the front end of the cylinder is exhausted through the line 117 which is now connected to the exhaust of the valve.

So that minute weight fluctuations in the ware on the scale platform from the correct or predetermined weight will be sufficient to operate valve 107, a portion of the air in the line 117 leading from the valve 107 is diverted through a line 117' and introduced into a valve 120 (Fig. 16) secured to the bottom of the valve 107 for amplifying the upward movement of scale beam 22. The entrance of air into the valve 120 is controlled by a ball 121 normally seating over and closing an opening 120' leading into the valve from the line 117'. The ball 121 is held in position over the opening 120' by the combined weights of a piston 122 mounted in the valve 120 and the piston 115 which rests on a rod 123 extending upwardly from the piston 122. The combined weight of this assembly is sufficient to overcome the lifting force at the opening 120'.

When the pressure in line 105 has been built up sufficiently by the approach of pin 113 to vent 109 to slightly move the trip piston 115 upwardly, it decreases the weight on piston 122 and ball 121, both of which are then instantly raised by the pressure in the line 117'. Valve 120 is now open and a puff of air enters line 124 from which it is directed upwardly through nozzle 125 against a plate 126 secured to balance lever 28 depending from the end of scale beam 22. The puff of air thus directed upwardly against the plate 126 immediately amplifies the movement of the scale beam 22 forcing it to the full upward position. When in this position, pin 113 has entirely closed vent 109, thereby increasing the air pressure in line 105, which instantly lifts trip piston 115 the full distance required to reverse valve 107. Thus the air introduced into the valve 120 amplifies the upward movement of the scale beam 22 and causes trip piston 115 to operate valve 107, although the air pressure in line 105 due to the vent 109 being only partially closed was insufficient at the start to completely raise the piston 115.

When the valve 107 has been reversed through the impulse created by the ware being overweight, the line 119 is connected across the valve 107 to the line 10 and air is introduced into the back end of the cylinder 118 (Fig. 17).

The cylinder 118 has a piston 130 slidable therein which carries a piston rod 131 connected at its forward end to a link 132 rotatably mounted on the adjustment of the feed control designated as 133. To turn the adjustment 133, each time air is admitted to the rear end of the cylinder 118, the link 132 carries a latch 134 which is moved into engagement with the teeth on an adjusting wheel 135 secured to the adjustment 133, as the piston 130 is moved forwardly and turns the adjustment to reduce the amount of glass being fed from the feeder. The latch 134 and link 132 are so designed that when the piston 130 is returned to the rear of the cylinder 118, the adjusting wheel 135 will not be turned.

To positively cause the latch 134 to engage the teeth on the adjusting wheel 135 as soon as the piston 130 has started to move toward the front end of the cylinder and, consequently, to secure full regulation of the adjustment 133, a spring pressed ball device 136 (Fig. 22) is provided which is mounted on a member 137 forming a guide for the piston rod 131 and which holds the rear end of the link 132 against movement until the latch has engaged one of the teeth on the wheel 135. Further movement of the piston rod causes the link to compress the spring and pass underneath the ball of the device 136.

So that the amount of turning imparted to the adjusting wheel 135 by the movement of the piston 130 may be controlled, and to reverse the valve 107 to again place it in condition to deliver air to the front end of the cylinder 118, a poppet valve 140 is provided which is adapted to be operated by the piston rod 131. The valve 140 (Figs. 31-34) is secured to a frame 141 slidably mounted in guides 142 supporting the member 137 and has a valve stem 143 normally held in its closed position by a spring 144. The valve 140 is constantly supplied with air from the tank 11 through a line 145 and when the valve is open, connects the line 145 to a line 146 leading to the valve 107.

Figure 1:
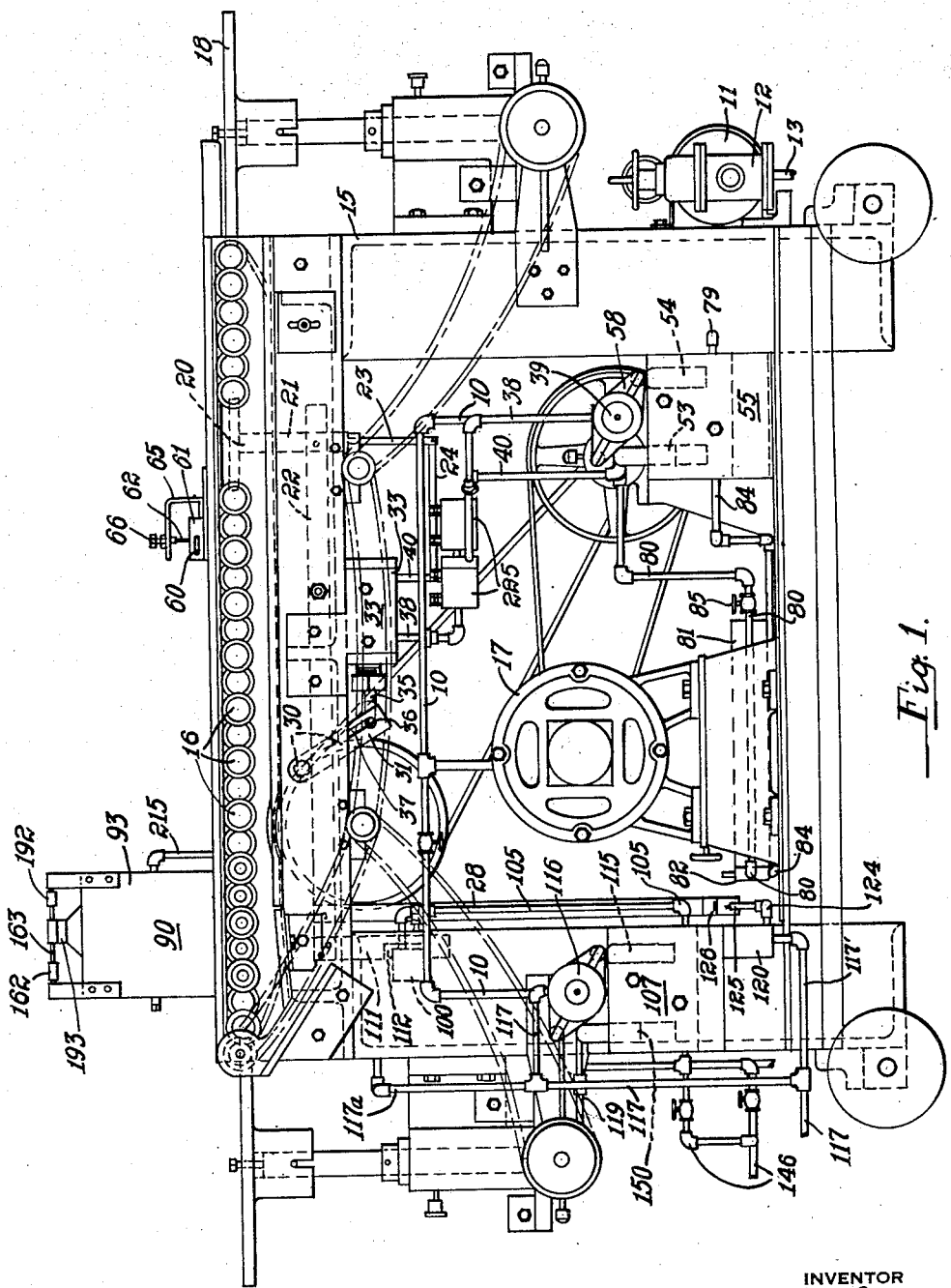
Figure 1 is a side elevation of a conveyor equipped with my improved apparatus and having a portion of the side thereof removed for convenience of illustration.

The valve 140 is so positioned on the frame 141 that the stem 143 thereof is directly in the path of travel of the piston rod 131 so that when the piston 130 is moved forward the rod 131 will strike the valve stem 143, compress the spring member 144 and connect the line 145 to the line 146. The air entering the line 146 is introduced underneath a trip piston 150 (Fig. 1) of the valve 107 which is raised and turns the rocker arm 116 and reverses the valve 107 so that the line 117 leading to the front end of the cylinder 118 is again connected to the main air line 10, and the line 119 to the exhaust. The piston 130 is then moved to the rear end of the cylinder in position to be again moved forward if the next piece of ware weighed is above the correct weight, to again reduce the amount of glass being fed from the feeder.

Figure 2:
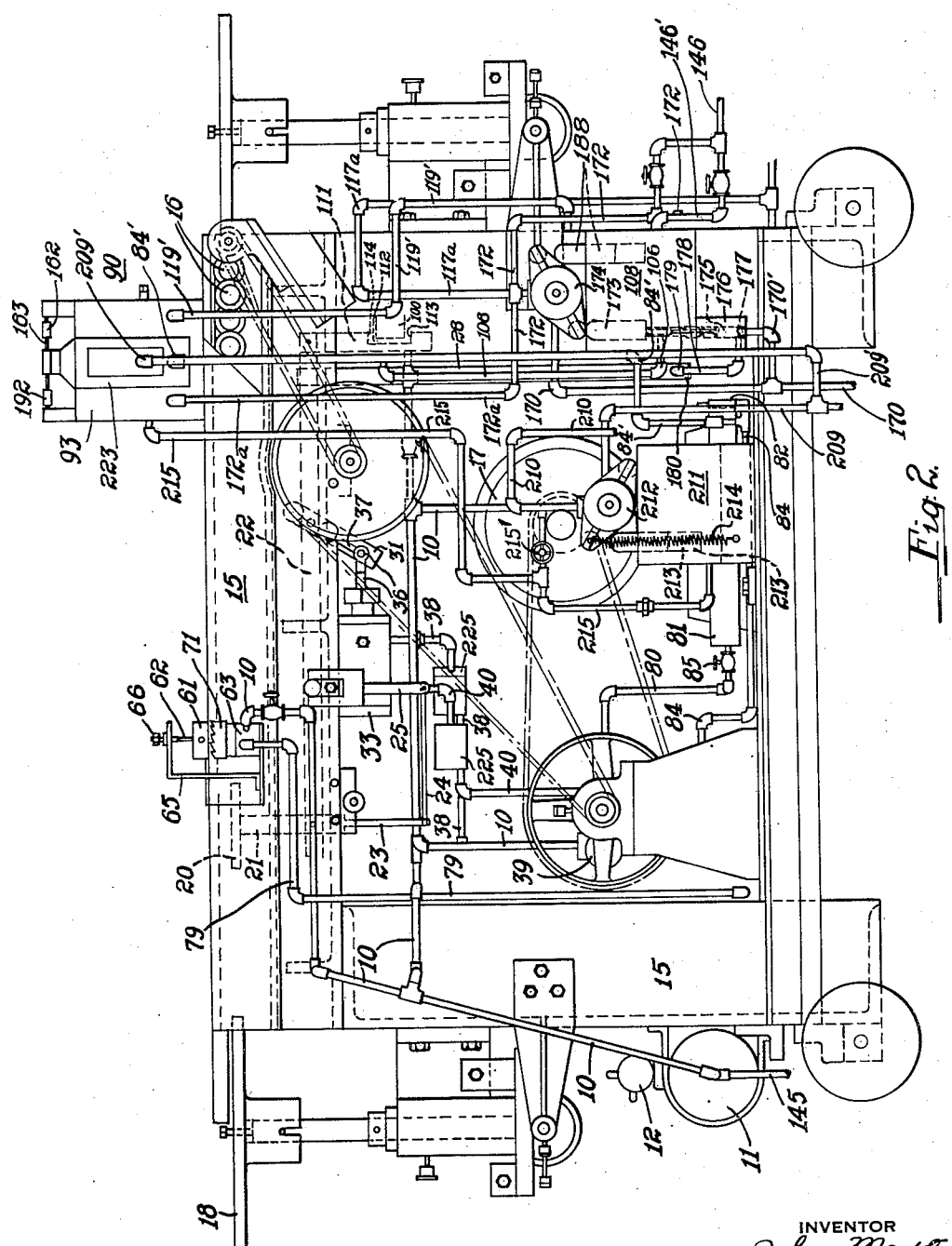
Fig. 2 is a side elevation of the opposite side of the conveyor equipped with my apparatus.

In order to indicate to the operator that the ware being weighed is heavy or above the correct weight, a portion of the air passing into the line 119 when the valve 107 is set to deliver air to the rear end of the cylinder 118 is diverted through a line 119' leading to the underside of a piston 160 of the indicating mechanism 90 (Figs. 2, 25, 30). The piston 160 carries a marker 161 having a suitable insignia or character thereon such as "H" which is raised into view each time the valve 107 is operated to direct air into the rear end of the cylinder 118.

When the marker 161 is raised designating that the ware on the scale platform is heavy, a finger 162 secured to a shaft 163 engages a slot (not shown) on the face of the marker 161 and holds it and the piston 160 in their raised position. The finger 162 on the shaft 163 holds the marker 161 in its raised position until a piece of ware is weighed which is either light or of correct weight even though the valve 107 has been reset and the supply of air to line 119 shut off. The purpose of holding the marker 161 in its raised position will be hereinafter explained.

If the feed control adjustment has been operated in accordance with the impulse created by a piece of ware heavy in weight and the heavy piece is followed by a piece of correct weight, the scale beam 22 is unlocked as heretofore described, and since the ware is of correct weight, there is no deflection of the scale beam and since no adjustment in the feed control is necessary, the piston 92 carrying the marker 91 having the insignia "W" thereon indicating that the apparatus is operating, is actuated. As the marker 91 is raised it strikes a trip finger 165 on the shaft 163 which turns the shaft and causes the finger 162 to release the marker 161 whereby it falls to its normal position. The operation of the apparatus when a light piece of ware follows a heavy piece will be explained in detail later on in this specification.

If, however, the ware on the scale platform had been light or below the predetermined or correct weight instead of heavy, then the weight 29 and lever 28 on the opposite end of the scale beam 22 from the platform 20 would pull the beam down and cause the pin 114 on the arm 111 to enter the vent 110 in the block valve 100. The entrance of the pin 114 into the vent causes the air being exhausted therethrough to pass through the opening 104 into the line 106 leading from the valve block to the reversing valve 108.

The reversing valve 108 is similar in construction to the valves 39 and 107 and is supplied with air through a branch 117a of the line 117 leading from the valve 107 to the front end of the cylinder 118. The valve 108 is so set that the air entering the valve through the line 117a passes into a line 170 leading to the front end of a cylinder 171 (Fig. 17), and a line 172 leading from the rear end of the cylinder is connected to the exhaust of the valve.

When the pin 114 has closed the vent 110 the pressure in line 106 leading to the underside of a trip piston 173 of the valve 108 is built up and raises the piston 173 which turns a rocker arm 174 and sets the valve 108 so that air is introduced into the rear end of the cylinder 171 through the line 172 and the line 170 is connected to the exhaust. To amplify the downward movement of scale beam 22, a portion of the air in line 170 is diverted through line 170' and introduced underneath a ball and piston 175 mounted in a valve 176 similar in construction to the valve 120. When the pressure in line 106 has been built up sufficiently by the approach of pin 114 to vent 110 to slightly move the trip piston 173 upwardly, it decreases the weight on piston 175 and ball 177, both of which instantly rise. Valve 176 is now open and a puff of air enters line 178 from which it is directed downwardly through nozzle 179 against the plate 126 secured to balance lever 28 depending from the end of scale beam 22. The puff of air thus directed downwardly against the plate 126 immediately amplifies the movement of the scale beam 22, forcing it to the full downward position. When in this position pin 114 has entirely closed vent 110 thereby increasing the air pressure in line 106, which instantly lifts trip piston 173 the full distance required to reverse valve 108. Thus, the air introduced into valve 176 amplifies the downward movement of scale beam 22 by overcoming the inertia of said beam, increases the scale sensitivity and causes trip piston 173 to operate valve 108, although the air pressure in line 106 due to the vent 110 being only partially closed was insufficient at the start of weighing operation to completely raise piston 173.

As soon as the rocker arm 174 on the valve 108 is turned, air is introduced into the cylinder 171 and moves a piston 181 which is slidably mounted therein to the front end of the cylinder. The piston 181 has a piston rod 182 connected thereto which has a pin and slot connection with a link 183 rotatably mounted on the adjustment 133. The link 183 has a latch 184 which is adapted to engage the teeth on the adjusting wheel 135 when the piston 181 is moved forward and to turn the adjustment 133 on the feeder in such manner that the weight of the charge being delivered from the feeder is increased. A spring pressed device 185 similar to the device 136 is employed to positively cause the latch 184 to engage the teeth on the wheel 135 and insure full turning of the adjustment 133.

To regulate the stroke of the piston 181, and consequently to control the amount of turning of the adjustment 133, a poppet valve 166 is provided which is adapted to operate the valve 108 and reverse the delivery of air to the cylinder 171. The valve 186 which is similar to the valve 140, is constantly supplied with air through the line 145 and has a spring pressed valve stem 187 which is normally held in its closed position to prevent air passing through the valve into the line 146 which is connected thereto. The valve 186 is mounted in the frame 141 and is so positioned that the valve stem 187 is in the path of travel of the piston rod 182. When the piston rod strikes the valve stem 187 it is compressed and air passes through the valve to the line 146 which has a branch 146' leading underneath a trip piston 188, mounted underneath the rocker arm 174 of the valve 108. The air in line 146' raises the piston 188 and turns the rocker arm 174 so that air is again delivered through line 170 to the front end of the cylinder 171 and the line 172 is connected to the exhaust, and the direction of movement of the piston 181 is reversed.

It is apparent from the construction so far described that when the valve 107 is turned to introduce air into the back end of the cylinder 118, the valve 108 cannot be operated to deliver air to the back end of the cylinder 171 since the valve 108 is supplied with air through the line 117a leading from the valve 107 which is closed when the valve 107 is operated. Therefore, if the rocker arm 174 on the valve 108 should be turned the piston in the cylinder 171 will not be operated and no false adjustment of the feed control can be made.

In order to lock the valve 107 and prevent accidental turning of the rocker arm 116 when the valve 108 is actuated by the ware being under the desired weight, the line 172 has a branch 172' which leads to the underside of the piston 150 (Fig. 3) of the valve 107. Therefore, when the rocker arm 174 is turned to deliver air through the line 172, a portion thereof is introduced under the piston 150 which is raised and holds the rocker arm 116 in its original position and preventing the delivery of air to the rear of the cylinder 118. The line 172' is connected to the line 146 and to prevent the air from passing into the line 146 a check valve 196 is interposed in the line 146. This check valve 196 prevents the raising of trip piston 188 of the valve 108 which is down at the time air is delivered to the line 172'.

In order to indicate that the ware being weighed is of light weight, each time the rocker arm 174 of the valve 108 is turned to direct air into the back end of the cylinder 171, a portion of the air passing into the line 172 is diverted into a line 172a which leads to the underside of a piston 190 in the indicating mechanism 90. The piston 190 carries a marker 191 having a suitable insignia such as the letter "L" thereon, which is raised into view each time that the valve 108 is operated to connect the line 172 across the valve to the supply line 117a and shows the operator that the ware being weighed is below the correct weight.

Figure 3:
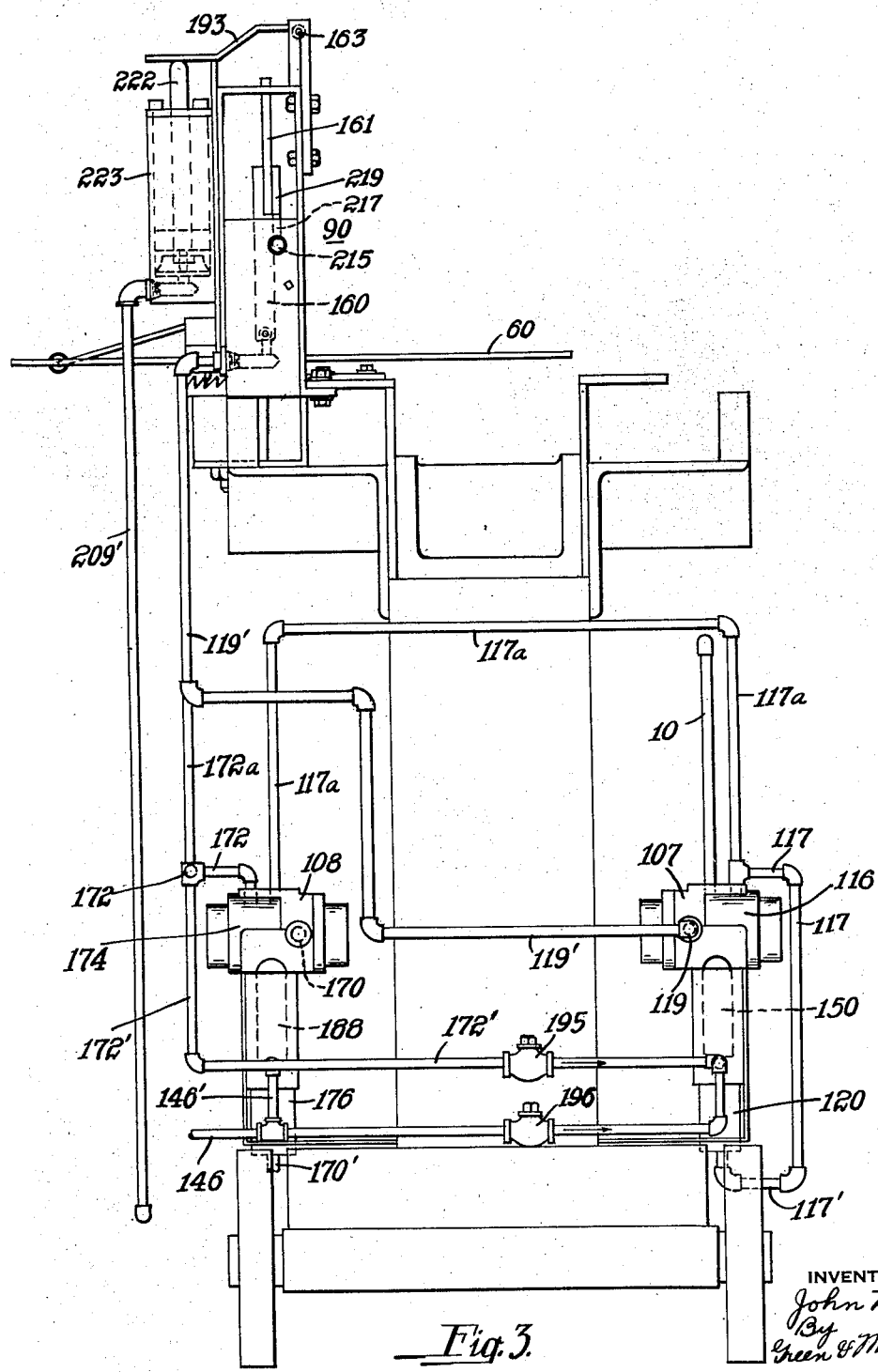
Fig. 3 is an end elevation of the conveyor illustrated in Figs. 1 and 2 having a portion thereof removed to more clearly illustrate my apparatus.

It should be noted that when either of the poppet valves 140 or 186 is operated by the movement of the piston rods 131 or 182, respectively, the trip pistons 150 and 188 of the valves 107 and 108, respectively, are both raised by the air directed into the line 146. One of these trip pistons resets the valve which has been operated while the other trip piston prevents the other valve from being accidentally operated. As is shown in Fig. 3, the line 146 is also connected to the line 172' and to prevent the air in line 146 from passing through the line 172' into the line 172a and raising the marker 191, a commercial ball check valve 195 is provided which permits air to pass in one direction only and prevents the air in line 146 from passing into the line 172'.

To prevent the air in line 172' from passing into the line 146 a commercial ball check valve 196 is provided which prevents the air in line 172' from being conveyed to the poppet valves 140 and 186 through the line 146.

When a piece of ware is weighed that is under or light in weight, the marker 191 is raised into view where it is held by a finger 192 on the shaft 163 which engages a slot (not shown) formed in one face of the marker until a succeeding piece of ware is weighed which is of correct or heavy weight.

If either the marker 161 indicating heavy ware or the marker 191 indicating light ware is in its raised position and the next piece of ware weighed after the adjustment has been made in the feed control, is of the correct or predetermined weight, the unlocking of the scale beam 22 causes the marker 91 to be raised which strikes the trip finger 165 on the shaft 163, and turns the shaft disengaging the finger 162 or 192 from the marker 161 or 191, respectively, depending on which marker is raised, and permits the marker to drop back into the housing 93.

It is apparent, however, that if the next piece of ware to be weighed (after a heavy or light piece has been weighed and the apparatus operated in accordance therewith) is light or heavy respectively, then if the full adjustment is imparted to the feed control, the succeeding charges of ware will fluctuate from light to heavy or heavy to light respectively. To prevent such fluctuation from light to heavy or heavy to light, I provide mechanism for reducing the amount of turning imparted to the adjustment on the feed control each time a light or heavy piece of ware follows a heavy or light piece respectively, the operation of which is controlled by the indicating mechanism 90.

This mechanism for reducing the amount of turning imparted to the wheel 135 by the forward movement of the pistons 130 and 181, comprises a cylinder 200 mounted on a plate 201 supporting the cylinders 118 and 171 and the guides 142 of the sliding frame 141. The cylinder 200 has a piston 202 slidable therein to which a piston rod 203 is connected. The piston rod 203 is connected to a rack bar 204 which engages a gear wheel 203' rotatably mounted on a plain part of a screw 206. Attached to the back side of gear wheel 203' is a pawl 204' which engages a pinion 205 on the forward stroke of piston rod 203, the pinion 205 being keyed or secured to the plain part of screw 206. The screw 206 is mounted in an angle member 207 on the plate 201 and is in threaded engagement with the frame 141 so that by turning the screw, the frame 141 may be moved back and forth in the guides 142 to position the poppet valves 140 and 186 closer to and farther from, respectively the front ends of the cylinders 118 and 171. The screw 206 has a knurled knob 208 on the end thereof for manually moving the frame 141 in the guides 142.

The piston 202 is moved forward and backward in the cylinder 200 by a motive fluid such as air introduced into the rear end of the cylinder through a line 209 and into the front end of a cylinder through a line 210. The air lines 209 and 210 lead to a reversing valve 211 (Fig. 2), similar to the reversing valves heretofore described, which is supplied with air from the main air line 10 and is so set that it is delivering air through the line 210 into the front end of the cylinder 200 while the line 209 is connected to the exhaust of the valve. To reverse the valve 211 and connect the line 209 with the line 10 and the line 210 with the exhaust of the valve, the valve is provided with a rocker arm 212 which is turned in one direction by a trip piston 213 and in the opposite direction by a spring member 214. The rocker arm 212 is normally maintained in the position shown in Fig. 2 by air admitted to the underside of the piston 213 through a line 215 connected to the main air line 10. A needle valve 215' is interposed between line 10 and line 215 to control the amount of air passing from line 10 to line 215.

To operate the valve 211 each time a light piece of ware follows a heavy piece, or a heavy piece follows a light one, the line 215 is connected to a passageway 216 formed in the housing 93 of the indicating mechanism 90. The passageway 216 has vents 217 and 218 leading to the top of the housing which are normally closed by pins 219 and 220 carried by the heavy marker 161 and the light marker 191, respectively. The needle valve 215' is so set that just enough air passes into the line 215 to hold the trip piston 213 and rocker arm 212 in the position shown when both the markers 161 and 191 are in their down position closing the vents 217 and 218.

As has been heretofore explained when a heavy or light piece of ware is weighed, either the marker 161 or 191 respectively, is raised and held in its upper position by the finger 162 or 192, respectively, and consequently, either the vent 217 or the vent 218 is uncovered and a portion of the air in the passageway is permitted to exhaust to the atmosphere.

For example, assume that a heavy piece of ware has been weighed, then the marker 161 has been raised and is now held in its upper position by the finger 162 and the vent 217 is uncovered. If the next piece weighed is light in weight then as soon as the scale beam is unlocked the valve 108 is operated and the marker 191 is raised to its upper position and the vent 218 is uncovered. As the marker 191 is raised, it strikes the finger 192 and turns the shaft 163 which releases the marker 161. To prevent the piston 160 and marker 161 from dropping into the housing 93 and closing the vent 217, a portion of the air underneath the piston 190 is delivered through a bypass 221 in the housing 93 to the underside of the piston 160 to hold it in its raised position and prevent the vent 217 from being closed.

When both the vents 217 and 218 are uncovered, a sufficient amount of air is permitted to exhaust to cause the pressure in the line 215 to drop and as a result of this drop in pressure, the spring member 214 turns the rocker arm 212 and causes air to be delivered to the back end of the cylinder 200 through the line 209 which moves the piston 202 forwardly turning the screw 206 which moves the frame 141 closer to the cylinders 118 and 171 and reduces the operative stroke of the pistons contained therein. The reducing of the stroke of the pistons in the cylinders 118 and 171 also reduces the amount of turning imparted to the wheel 135 and consequently, reduces the turning of the adjustment 133.

As soon as the rocker arm 212 has been turned to connect the line 10 with the line 209 to move the piston 202 toward the front of the cylinder 200, a portion of the air in line 209 is diverted through a line 209' leading to the underside of a piston 222 mounted in a block 223 secured to the housing 93. The piston 222 is disposed underneath the end of the trip finger 165 and when air is directed through the line 209', the piston 222 is raised which in turn raises the finger 165 and turns the shaft 163 so that the fingers 162 and 192 release the markers 161 and 191, respectively. When the markers 161 and 191 are released they fall into the housing 93 and the pins 219 and 220 drop into and close the vents 217 and 218. As soon as these vents are closed, the pressure in line 215 builds up and raises the trip piston 213 against the tension of the spring 214, turning the rocker arm 212 and reversing the delivery of air to the cylinder 200, whereby the piston 202 is returned to the rear end of the cylinder.

If the ware weighed had been light and the next piece weighed had been heavy, the light marker would be up and as soon as the heavy marker is raised, the same operation would take place and the screw 206 would be turned to move the frame and position the poppet valves closer to the piston rods 131 and 182 to reduce the stroke thereof and consequently, the amount of turning given to the wheel 135.

From this construction it is apparent that when the ware fluctuates from light to heavy or from heavy to light, the frame 141 is gradually moved toward the front end of the cylinder 118 and 171 and as a result, the stroke of the pistons 130 and 181 controlling the turning of the adjustment wheel 135 are gradually reduced and the charges fed from the feeder are gradually regulated until correct weight is secured.

In order to control the speed of the pistons in the operating cylinders 33, 118, and 171, a check valve 225 (Figs. 37–39) is interposed in each of the lines leading to the front and rear ends of these cylinders for controlling the passage of air to and from the same. The check valve 225 comprises a block 226 having a passageway 227 which is connected to one end of an air supply line. The passageway 227 is connected to a passageway 228 which leads to the other end of the supply line by an opening 229 and by a series of openings 230, 231, and 232 opening into each other. Mounted in the openings 229 and 232 are balls 233 and 234, respectively, one of which closes its opening when the air is passing through the valve in one direction and the other closes its corresponding opening when the air is passing through the valve in the opposite direction.

To control the speed of the air through the valve, set screws 235 and 236 are provided which limit the unseating of the balls 233 and 234, respectively, and consequently, control the size of openings uncovered thereby. When the air is entering the passageway 227 it passes into the opening 229, unseats the ball 233 and passes into the passageway 228. At the same time, a portion of the air in passageway 227 passes through openings 230 and 231 and causes the ball 234 to seat over the opening 232. When the direction of air is reversed the ball 233 is seated and the ball 234 is unseated. From this construction, it is apparent that the speed of the air passing through the valve in either direction can be readily controlled by the set screws 235 and 236 and one rate of speed can be secured when the air is passing in one direction, and another rate of speed when the air is passing in the opposite direction.

From the foregoing description, it is apparent that I have provided an apparatus for controlling the adjustment on a feeding or filling device which makes corrections in the adjustment by increasing the amount of material being fed when a delivered charge is below weight, and decreasing the amount of material being fed when the delivered charge is above weight and reduces the regulation of the adjustment on the feed control of the filling or feeding device when a charge, above or below the correct weight, is fed from the device and the next charge fed therefrom is below or above, respectively, the predetermined weight and thereby prevents the charges being fed from fluctuating in sequence from heavy to light or light to heavy weight. It is also apparent that with my apparatus, successive charges of exact weight will be discharged from the device and since each part of the device is locked in its inoperative position when another part thereof is being actuated, false regulation of the feed control is prevented.

While I have described one embodiment of my apparatus as being operated by air motors, the delivery of air to each of which is controlled by a reversing valve actuated by impulses created by differences in pressure, it is to be understood that other means may be employed to regulate the adjustment on the feeding or filling device.

It is also to be understood that certain other changes, modifications, substitutions and omissions may be made in the illustrated embodiment of my invention without departing from the spirit thereof or the scope of the appended claims.

What I claim as new and desire to secure by Letters Patent is:

1. Apparatus for automatically maintaining a uniform feed charge from a filling or feeding device having a turnable feed control, comprising mechanism for weighing the charges delivered from said feeding device, mechanisms for turning the feed control to increase and decrease the weight of succeeding charges, means controlled by said weighing means for operating said feed control turning mechanisms and means for reducing the operative movement of said feed control turning mechanisms to prevent sequential fluctuations in weight of the charges.

2. An apparatus for automatically maintaining a uniform feed charge from a filling or feeding device having a feed control, comprising means for weighing the charges delivered from said device, mechanism for turning the feed control to increase the weight of the charge, mechanism for turning the feed control to decrease the weight of the charge, means responsive to deflections in said weighing means for actuating said feed control turning mechanisms and means for reducing the movement of said turning mechanisms when succeeding charges fluctuate from one side to the other of the predetermined weight.

3. Apparatus for regulating the feed control on a device adapted to periodically feed a predetermined quantity of material therefrom comprising means for determining weight variations in the delivered quantity of material, means for adjusting the feed control in accordance with deflections in the weight determining means, and means for regulating said adjusting means to secure uniform weight in the quantities being fed from said device when weight varies from side to side of the predetermined weight.

4. Apparatus for regulating the feed control of a device adapted to periodically feed charges therefrom comprising, means for operating the feed control to regulate the weight of the charge being fed therefrom, means responsive to fluctuations from a predetermined weight in the charges fed for actuating the operating means of the feed control and means for regulating the amount of adjustment imparted to the feed control by the operating means.

5. Apparatus for regulating the feed control of a device adapted to periodically feed charges therefrom comprising, means for operating the feed control to regulate the weight of the charge, means responsive to weight variations in the charges fed for actuating the operating means of the feed control means for limiting the operative movement of said feed control operating means, and means for adjusting said limiting means to prevent fluctuations in weight of succeeding charges.

6. Apparatus for automatically regulating the adjustable feed control of a device adapted to periodically feed charges therefrom comprising, means for operating the feed control to regulate the weight of the charge, weighing means adapted to be deflected by fluctuations of the charges from a predetermined weight, means responsive to slight deflections of said weighing means for amplifying the movement thereof, and means responsive to the amplified movement of said weighing means for actuating the operating means of said feed control.

7. Apparatus for regulating the feed control of a device adapted to periodically feed charges therefrom comprising, means for operating the feed control to regulate the weight of the charge, means for weighing a charge, means for conveying succeeding charges across said weighing means, means for locking said weighing means in inoperative position, means actuated by the passage of the charges across said weighing means for periodically operating said locking means, and means responsive to deflections in said weighing means for actuating the operating means of the feed control.

8. Apparatus for regulating the feed control of a device adapted to periodically feed charges therefrom, comprising means for turning the feed control, means for weighing the delivered charges, said weighing means being adapted to be deflected by weight fluctuations in the charges, means responsive to the deflections in the weighing means for actuating the feed control turning means, mechanism for indicating the fluctuations in weight of the charges weighed, and means responsive to the indicating mechanism for progressively reducing the operative movement of said feed control turning means.

9. Apparatus for automatically regulating the feed control on a device adapted to periodically feed charges therefrom, comprising means for weighing the charges fed from said device adapted to be deflected by fluctuations therein from a predetermined weight, means for amplifying the deflection of said weighing means to detect slight weight fluctuations in the charges weighed, mechanism for operating said feed control, a reversing valve to control said mechanism, means responsive to the deflections of said weighing means for actuating said reversing valve, and means for resetting said valve as soon as an adjustment has been made in said feed control.

10. Apparatus for adjusting the feed control on a device adapted to periodically feed uniform charges therefrom comprising a device for weighing the charges to detect fluctuations therein from a predetermined weight, means responsive to deflections in said weighing device for indicating the fluctuation of the charge weighed from the predetermined weight, means responsive to the deflections in said weighing device for operating said feed control, means for resetting said feed control operating means, and means actuated by the indicating means to reduce the amount of adjustment of the feed control when succeeding charges fluctuate from one side of the predetermined weight to the other.

11. Apparatus for regulating the feed control adjustment on a filling or feeding device comprising mechanisms for turning said adjustment in opposite directions, means for weighing the charges fed from said device, means responsive to the fluctuations of a charge from a predetermined weight for operating one of said mechanisms, means for limiting the operative movement of said mechanisms, and means for adjusting said last-mentioned means when the weight of succeeding charges fluctuate from one side to the other of the predetermined weight to further reduce the operative movement of said mechanisms.

12. Apparatus for automatically regulating the feed control on a device for feeding a series of charges therefrom of substantially uniform weight comprising a scale for weighing the charges delivered from said device to detect fluctuations therein from a predetermined weight, mechanism for turning the feed control to reduce the weight of the charge, mechanism for turning the feed control to increase the weight of the charge, means actuated by the deflections of said scale for actuating one of said feed control turning mechanisms, means for resetting the feed control turning mechanisms after each operation thereof, mechanism for indicating the fluctuation in weight of the charge on the scale and means associated with said indicating mechanism for adjusting the resetting means when succeeding charges fluctuate from one side of the predetermined weight to the other.

13. An apparatus for automatically regulating the feed control in accordance with variations in the weight of previously delivered charges, comprising mechanism for operating the feed control to increase the weight of the charges fed from said device, mechanism for operating the feed control to decrease the weight of the charges, each of said mechanisms including mechanism displaced upon each operation, means for weighing the charges to detect fluctuations therein from a predetermined weight, means associated with said weighing means for actuating said feed control operating mechanisms, and means for resetting said feed control operating mechanisms.

14. The combination with a feeding or filling device having an adjustable feed control, of means for adjusting the feed control to secure successive charges of a predetermined weight, comprising a scale mechanism for weighing a charge, a motor for operating said feed control, means for turning the deflections of said scale into actuating impulses for said motor, means for reversing said motor and means for adjusting the motor reversing means when succeeding charges fluctuate from one side of the predetermined weight to the other.

15. The combination with a feeding or filling device having a feed control, of means for automatically adjusting the feed control to secure successive charges of a predetermined weight, comprising a scale for detecting fluctuations in the charges from the predetermined weight, a reversible motor for operating said feed control, a reversing valve associated with said motor, means responsive to the deflections of said scale for actuating said reversing valve to energize said motor, means for resetting said valve to reverse said motor, and means for adjusting said valve resetting means to limit the amount of turning imparted to said feed control by said motor.

16. The combination with a feeding or filling device having a feed control, of means for adjusting the feed control to secure successive feed charges of a predetermined weight, comprising a reversible motor for operating said feed control, a reversing valve associated with said motor, a scale, an indicating mechanism, means responsive to deflections in said scale for operating said reversing valve and said indicating mechanism, means for resetting said valve to reverse said motor, and means responsive to said indicating mechanism for adjusting said valve resetting means.

17. The combination with a feeding or filling device having an adjustable feed control, of means for adjusting the feed control to secure successive feed charges of uniform weight, comprising a scale having a platform, a lock, means for moving said lock into engagement with the scale, means controlled by the charges passing over said platform for unlocking said scale, means for operating the feed control, means actuated by the deflections of said scale for operating the feed control operating means, and means for actuating the lock moving means after a predetermined interval of time to relock said scale.

18. In an apparatus of the character described, a series of indicators, a scale having a beam, reversible means for locking said beam in inoperative position, means for reversing said locking means to unlock said beam, means associated with said unlocking means for operating one of said indicators, means responsive to the deflections of said beam for operating said other indicators, trip means for holding said last mentioned indicators in operated position, and means adapted to be actuated when each of said indicators is operated for releasing said trip means.

19. The combination with a feeding or filling device having an adjustable feed control, of means for automatically adjusting the feed control to secure successive charges of uniform weight, comprising mechanism for operating said feed control, movable means for limiting the movement of said feed control operating mechanism, a weighing device for detecting fluctuations in weight in the charge delivered from said feeding device, a pair of weight indicators, means responsive to the deflections of said device for actuating said feed control operating mechanism and said indicators, means for holding each of said indicators in operated position, means actuated on the retention of said indicators in their operated position for moving said limiting means to decrease the effective movement of said feed control operating mechanism, and means for releasing said indicators.

20. The combination with a feeding or filling device having an adjustable feed control, of means for automatically adjusting said control, comprising a weighing device, a plurality of weight indicators, mechanism for operating said feed control, means responsive to the deflections of said weighing device for actuating said feed control operating mechanism and said indicators, means for holding each of said indicators in operated position, means actuated on the retention of the indicators in their operated position for limiting the adjustment of said feed control, and means for releasing said indicators.

21. The combination with a feeding or filling device having an adjustable feed control, of means for automatically operating said feed control in accordance with the fluctuation in weight of a delivered charge to secure successive charges of a uniform weight, comprising means for weighing the charges delivered from said device, means for indicating the fluctuation from a predetermined weight in the charge weighed, means for operating the feed control, and means responsive to the deflections of said weighing means for actuating the feed control operating means and said indicating means.

22. The combination with a feeding or filling device having an adjustable feed control, of means for automatically operating said feed control in accordance with the fluctuation in weight of a delivered charge to secure successive charges of uniform weight, comprising means for weighing the charges delivered from said device, means for indicating the fluctuation from a predetermined weight in the charge weighed, means for operating the feed control, movable means for limiting the operative movement of said feed control operating means, means responsive to the deflections of the weighing means for actuating said feed control operating means and said indicating means, and means responsive to said indicating means for actuating said movement limiting means of the feed control operating means.

23. The combination with a feeding or filling device having an adjustable feed control, of means for automatically operating said feed control in accordance with the fluctuation in weight of a delivered charge to secure successive charges of a uniform weight, comprising means for weighing the charges delivered from said device, means for indicating the fluctuation from a predetermined weight in the charge weighed, means for operating the feed control, means for resetting the feed control operating means, means for adjusting the resetting means to limit the operative movement of said feed control operating means, means responsive to deflections of the weighing means for actuating said feed control operating means and said indicating means, and means responsive to the operation of said indicating means for actuating said adjusting means to change the position of the resetting means.

24. In combination with an apparatus of the character described, a weighing scale having a platform and a beam, means for directing pressure against said beam to amplify the deflections thereof and means controlled by the deflections of said beam for actuating said pressure directing means.

25. The combination in an apparatus of the character described comprising a charge feeder having adjustable feed control, mechanisms for operating said control, a scale having a platform and a beam, a lock for normally holding said beam in an inoperative position, means for actuating said lock to release said beam, a conveyor for transferring the charges delivered from said feeder across said scale platform, means actuated by the passage of material across said platform for operating said lock actuating means, and means for turning the deflections of said beam into impulses for actuating said mechanisms.

26. The combination with a charge feeder having an adjustable feed control comprising a scale for weighing the charges fed from said feeder, a beam associated with said scale, mechanisms for operating the feed control, reversing means for said mechanisms, means responsive to the deflections of said beam for actuating said reversing means and operating said mechanisms, and stop means operated by said mechanisms for resetting said reversing means and returning said mechanisms to their original position.

27. In combination with an apparatus of the character described, mechanism for operating the feed control of a charge feeder, stop means for limiting the operative movement of said feed control operating mechanisms, reversing means for said mechanisms, means for actuating said reversing means and means responsive to the operation of said stop means for resetting said reversing means.

28. In combination with an apparatus of the character described, mechanisms for operating the adjustable feed control of a charge feeder, movable stop means for limiting the operative movement of said feed control operating mechanisms, reversing means for said mechanisms, means for actuating said reversing means to operate said mechanisms, means responsive to the operation of said stop means for resetting said reversing means, and means for moving said stop means to reduce the operative movement of said feed control operating mechanisms.

29. In an apparatus of the character described, a weighing device having a platform and a beam, a lock for said beam, means for moving said lock into and out of locking engagement with said beam, means for conveying articles to be weighed across said platform, means actuated by the passage of articles across the platform for operating said lock moving means to move the lock away from the beam, and means for resetting said beam locking means.

30. In an apparatus of the character described, a weighing device having a platform and a beam, a lock for said beam, a reversible motor for moving the lock into and out of engagement with the beam, means for conveying articles to be weighed across said platform, means actuated by the passage of the articles across the platform for actuating said motor to move said locks out of engagement with the beam, and means for reversing said motor to move said lock into engagement with said beam.

31. In an apparatus of the character described, a weighing device having a platform and a beam, a lock for said beam, a reversible motor for moving said lock into and out of locking engagement with the beam, a reversing valve for said motor, means for conveying articles to be weighed across said platform, means actuated by the passage of the articles across the platform for operating said reversing valve to actuate said motor and move said lock out of engagement with the beam, and means for resetting said reversing valve to reverse said motor and relock said beam.

32. The combination with a feeding and filling device having an adjustable feed control means for automatically adjusting said control comprising a weighing device having a beam adapted to be deflected by the weight fluctuations in the charges weighed, a valve having normally open ports associated with said beam, a pressure line leading to said valve, means carried by said beam adapted to enter and close one of said ports on the deflections of the beam to build up a pressure in said line, and means responsive to the building up of pressure in said line for operating the feed control.

33. The combination with a feeding or filling device having an adjustable feed control, of means for adjusting the feed control to secure successive charges of uniform weight, comprising a weighing device having a beam adapted to be deflected by the weight fluctuations of the charges weighed thereon, a block valve having normally open ports on each side of said beam, a pressure line connected to said block valve, a motor for operating said feed control, means carried by said beam adapted to enter and close one of said ports each time the beam is deflected to build up a pressure in said line, and means responsive to the building up of the pressure in said line for operating said motor.

34. The combination with a feeding or filling device having an adjustable feed control, of means for adjusting the feed control to secure successive charges of uniform weight, comprising a weighing device having a beam adapted to be deflected by weight fluctuations of the charges weighed, a block valve associated with said beam and having normally open ports, a pressure line leading to said block valve, a pair of unbalanced reversing valves, a line connecting each of said reversing valves with said block valve, a motor connected to each of said reversing valves and adapted to operate said control, means on said beam adapted to enter and close one of said ports on the deflections thereof to build up the pressure in a line leading to one of the reversing valves to unbalance the same and energize the motor associated therewith, and means responsive to the operation of said motors for resetting said reversing valves.

35. The combination with a feeding or filling device having an adjustable feed control, of means for adjusting the feed control to secure successive charges of uniform weight, comprising a weighing device having a beam adapted to be deflected by weight fluctuations in the charges made, a block valve associated with said beam and having normally open ports, a pressure line leading to said block valve and connected to atmosphere through said ports, a pair of unbalanced reversing valves, a line connecting each of said reversing valves with said block valve, a motor connected to each of said reversing valves adapted to operate said feed control, means on said beam adapted to enter and close one of the ports in said block valve on the deflection of the beam to build up pressure and overbalance one of the reversing valves and energize the motor connected thereto and a poppet valve for each of said motors adapted to be actuated by the operation thereof for relieving the overbalanced condition of said reversing valve.

36. The combination with a feeding or filling device having an adjustable feed control, of means for adjusting the feed control to secure successive charges of uniform weight, comprising a weighing device having a beam adapted to be deflected by weight fluctuations in the charges weighed, a block valve associated with said beam and having normally open ports, a pressure line leading to said valve and connected to said ports, a pair of unbalanced reversing valves, a line connecting each of said reversing valves to said block valve, a motor connected to each of said reversing valves and adapted to operate the feed control, means on said beam adapted to enter and close one of the ports in said valve block as the beam is deflected to build up the pressure in the line leading to one of the reversing valves and overbalance the same and operate the motor associated therewith, a valve for resetting each of said reversing valves actuated by the operation of said motors, and means for varying the position of said last-mentioned valves to progressively vary the adjustment imparted to the feed control by the motors.

37. The combination with a feeding or filling device having adjustable feed control, of means for adjusting the feed control to secure successive charges of uniform weight, comprising a weighing device having a beam adapted to be deflected by weight fluctuations in the charges weighed, a block valve associated with said beam and having normally open ports, a pressure line leading to said block valve, a pair of unbalanced reversing valves, a line connecting each of said reversing valves with said block valve, a motor connected to each of said reversing valves adapted to operate the feed control, a weight indicating mechanism associated with said reversing valves, means on said beam adapted to enter and close one of the ports in said block as the beam is deflected to build up the pressure in the line leading to one of the reversing valves to overbalance the same and operate the motor associated therewith and said weight indicating mechanism, means for retaining said weight indicating mechanism in its operated position, movable means actuated by the operation of said motor for resetting said reversing valves, and means responsive to weight indicating mechanism for changing the position of the reversing valve resetting means.

JOHN MAYO.